United States Patent
Jung et al.

(10) Patent No.: US 7,227,976 B1
(45) Date of Patent: Jun. 5, 2007

(54) METHOD AND SYSTEM FOR REAL-TIME FACIAL IMAGE ENHANCEMENT

(75) Inventors: Namsoon Jung, State College, PA (US); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 702 days.

(21) Appl. No.: 10/609,245

(22) Filed: Jun. 27, 2003

Related U.S. Application Data

(60) Provisional application No. 60/394,324, filed on Jul. 8, 2002.

(51) Int. Cl.
G06K 9/00 (2006.01)
G06T 15/00 (2006.01)
A61B 3/10 (2006.01)

(52) U.S. Cl. .............. 382/103; 345/419; 382/117; 382/118; 351/211

(58) Field of Classification Search ........ 382/115–118, 382/103; 351/211
See application file for complete search history.

(56) References Cited

U.S. PATENT DOCUMENTS

| | | | |
|---|---|---|---|
| 4,852,184 A * | 7/1989 | Tamura et al. | 382/282 |
| 5,802,220 A * | 9/1998 | Black et al. | 382/276 |
| 5,852,669 A | 12/1998 | Eleftheriadis et al. | |
| 6,381,345 B1 | 4/2002 | Swain | |
| 6,400,374 B2 | 6/2002 | Lanier | |
| 6,508,553 B2 * | 1/2003 | Gao et al. | 351/227 |
| 6,634,754 B2 * | 10/2003 | Fukuma et al. | 351/227 |
| 6,944,327 B1 * | 9/2005 | Soatto | 382/154 |
| 7,184,602 B2 * | 2/2007 | Cohen et al. | 382/243 |

OTHER PUBLICATIONS

L. Rui et al., Proc. 14th IEEE Intl. Conf. Automatic Face and Gesture Recognition, pp. 239-244, 2000.
A. Schubert, Proc. 14th IEEE Intl Conf. Automatic Face and Gesture Recognition, pp. 116-121,2000.
R. Sharma et al., Proc. IEEE special issue on Multimedia Signal Processing, 86(5):853-869, May 1998.
F. Smeraldi et al., Proc. International Conf. on Image Processing, pp. 163-167, 1998.
Q.B. Sun et al., Proc. 3rd IEEE Intl. Conf. on Automatic Face and Gesture Recognition,pp. 130-135, 1998.

(Continued)

*Primary Examiner*—Joseph Mancuso
*Assistant Examiner*—Hadi Akhavannik

(57) ABSTRACT

The present invention is a system and method for detecting facial features of humans in a continuous video and superimposing virtual objects onto the features automatically and dynamically in real-time. The suggested system is named Facial Enhancement Technology (FET). The FET system consists of three major modules, initialization module, facial feature detection module, and superimposition module. Each module requires demanding processing time and resources by nature, but the FET system integrates these modules in such a way that real time processing is possible. The users can interact with the system and select the objects on the screen. The superimposed image moves along with the user's random motion dynamically. The FET system enables the user to experience something that was not possible before by augmenting the person's facial images. The hardware of the FET system comprises the continuous image-capturing device, image processing and controlling system, and output display system.

22 Claims, 9 Drawing Sheets

OTHER PUBLICATIONS

Figure 1:
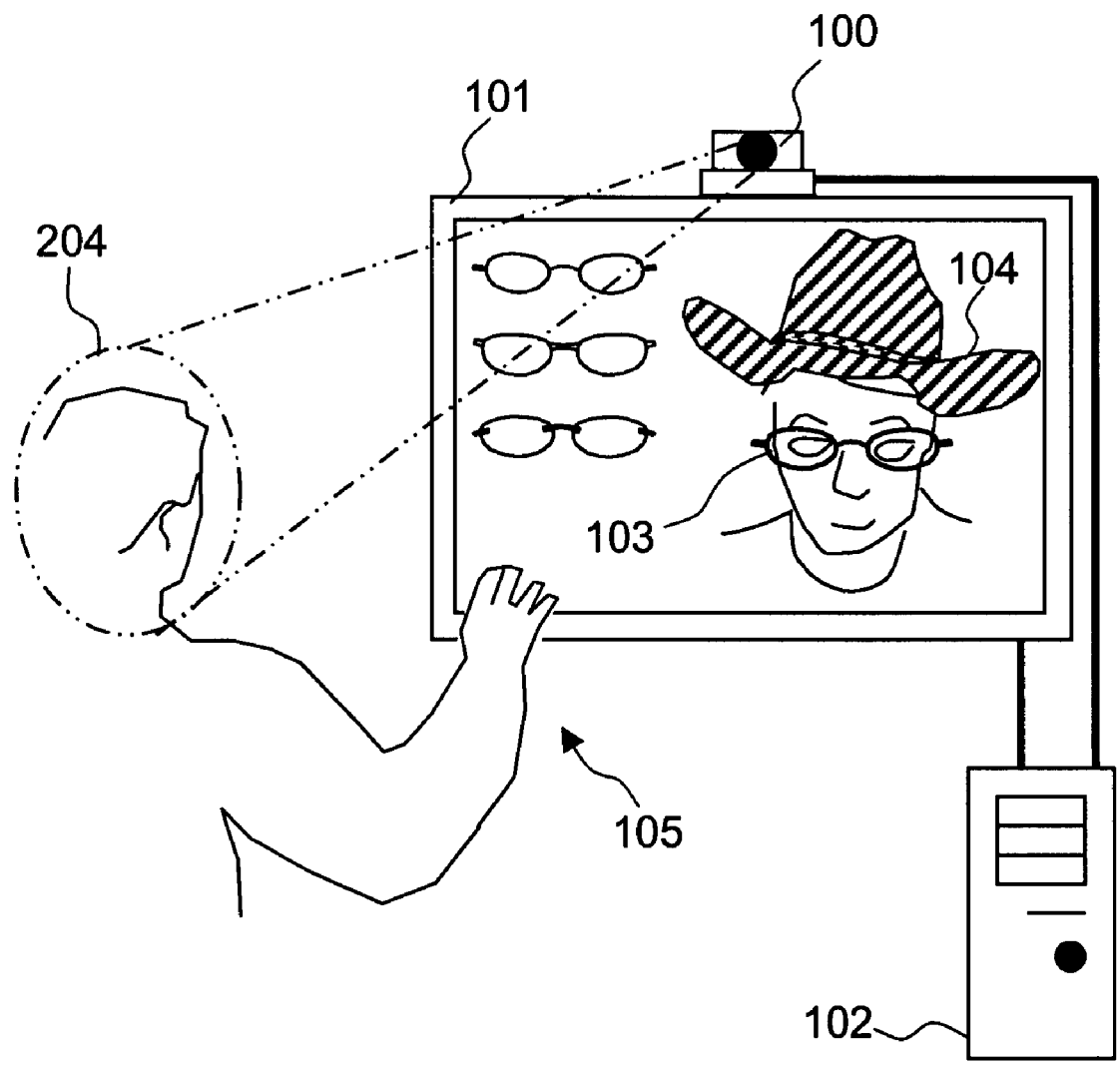

M.H. Yang et al., A survey on face detection methods. IEEE Trans. on PAMI, 2001.

L. Zhang et al.,Proc. Conf. Knowledge-Based Intel. Eng. Systems and Allied Tech.,vol. 1,pp. 117-120,2000.

X. Zhang et al., Proc. 4th International Conference on Signal Processing, vol. 2, pp. 889-892, 1998.

D. Beymer, Proceedings IEEE Computer Society Conference on CVPR, pp. 921-928, 1996.

V. Chandrasekaran, IEEE Conf. Computational Cybernectics and Simulation, vol. 3,pp. 2022-2027, 1997.

A.J. Colmenarez, et al., Proc. International Conference on Image Processing, vol. 1, pp. 657-661, 1999.

A.J. Colmenarez, et al., Proc. International Conf. on Pattern Recognition, vol. 1, pp. 222-224, 1998.

H. Demirel et al.,Proc. Intl. Information,Communications and Signal Processing, pp. 984-988, 1997.

L. Fan et al., ACM Multimedia 2000, pp. 295-302, 2000.

D.O. Gorodnichy et al.,Lecture Notes Comp. Sci.,vol. 1311(ICIAP'97 Proc.vol. II),pp. 332-339, Springer, 1997.

C.L. Huang et al, Pattern Recognition, 25(12), pp. 1435-1444, 1992.

W. Huang et al., Proc.14th International Conf. on Pattern Recognition, vol. 1, pp. 110-113, 1998.

K.M. Lam et al., Proc. 14th International Conf. on Signal Processing, vol. 2, pp. 1100-1103, 1998.

H.W. Lee et al., Proc. IEEE Intl. Symposium on Industrial Electronics, vol. 1, pp. 254-259, 2001.

S. Lee et al., Proc.International Conference on Virtual Systems and MultiMedia, 2001.

C.H. Lin et al., IEEE transactions on image processing, vol. 8, No. 6, pp. 834-845, Jun. 1999.

M. Lyons et al., Proceedings of ACM Multimedia 98, pp. 427-434, 1998.

B. Moghaddam et al., Proc. International Conf. on Image Processing, vol. 3, pp. 512-515, 1995.

H. Moon et al., Proc. International Conf. on Image Processing, vol. 3, pp. 885-888, 2000.

T. Nguyen et al., Proc. International Symposium on Computer Vision, pp. 593-598, 1995.

R. Pinto-Elias et al., Proc. 14th International Conf. on Pattern Recognition, vol. 12, pp. 1360-1364, 1998.

D. Reisfeld et al., 11th International Conf. on Pattern Recognition, vol. 1, pp. 117-120, 1992.

M. Rizon et al.,Proc.Intl.Conf.Intel.Systems and Tech. for the Next Millennium,vol. 2, pp. 415-420,2000.

* cited by examiner

METHOD AND SYSTEM FOR REAL-TIME FACIAL IMAGE ENHANCEMENT

CROSS-REFERENCE TO RELATED APPLICATIONS

This application is entitled to the benefit of Provisional patent application Ser. No. 60/394,324, filed Jul. 8, 2002.

FEDERALLY SPONSORED RESEARCH

Not Applicable

SEQUENCE LISTING OR PROGRAM

Not Applicable

BACKGROUND OF THE INVENTION

1. Field of the Invention

The present invention relates to a system and method for enhancing facial images by superimposing virtual objects on top of the continuous 2D human face image in real-time automatically and dynamically, using the facial feature information. The technique gives the user a personalized virtual reality experience overall.

2. Background of the Invention

There is a significant need in the art for a system and method for enhancing human facial images in the virtual world. Human face has been one of the most fascinating objects in computer vision. Capturing and modeling of the human face image is frequently attempted in virtual reality. For example, avatar creation is an interesting technique, which is also commercially used by many companies. The avatar creation tools usually superimpose the human face image onto the static template or pre-handled video image background. One good example of using the pre-handled video image sequences is suggested by S. Lee, K. Wohn, Y. Ahn, and S. Lee in "CFBOX:Superimposing 3D Human Face on Motion Picture", in Proceedings of International Conference on Virtual Systems and Multimedia, 2001. Another example of avatar creation is shown by M. Lyons, A. Plante, S. Jehan, S. Inoue, and S. Akamatsu in "Avatar Creation using Automatic Face Recognition", in Proceedings of ACM Multimedia 98, pages 427-434, 1998. U.S. Pat. No. 6,400,374 of Lanier disclosed a system for superimposing a foreground image like a human head with face to the background image.

In these approaches, the human face image essentially becomes the superimposing object to the background templates or pre-handled video image sequences. However, we can also superimpose other virtual objects onto the human face image. Human facial features, the smaller sub-objects on the face image, can provide the useful local coordinate information within the face image in order to augment the human facial image.

In the case of avatar creation, which is mentioned above, the captured face image and the motion of the user do not affect the visual result because the static template or pre-handled video sequence is a pre-defined static entity. In other words, the static background does not change or respond according to the user's motion. However, in the FET system, the superimposing virtual objects are attached to the user's face image and move along the face or body movement in real-time dynamically and automatically.

Conventionally, the facial feature detection has been one of the most researched topics in the computer vision community. One of the important facts of the facial feature detection resides in its practical applicability. It can be used for many computer vision applications, and it can also be used to support other computer vision algorithms, such as face recognition. Some examples of facial feature extraction applications are human face recognition, automated visual interpretation, security access control, low bit-rate video coding, automatic annotation for image database, and development of friendly human interfaces. U.S. Pat. No. 5,802,220 of Black et al., U.S. Pat. No. 5,852,669 of Eleftheriadis et al., and U.S. Pat. No. 6,381,345 of Swain disclosed systems for facial feature detection and tracking.

The FET system also uses the facial feature detection technique as a part of the modules within the system. However, it is not a simple facial feature detector nor facial feature tracker but a real-time facial image enhancement system. The FET system is a method and apparatus for enhancing facial images in a continuous video by superimposing virtual objects onto the facial images automatically and dynamically in real-time, comprising three main modules of initialization module, facial feature detection module, and superimposition module.

SUMMARY

The present invention processes a sequence of input images received from an image-capturing device, such as camera. Following is a brief description of the implementation steps in the FET system. First, face detection locates the face in the continuous input image sequence. The result of the face detection is used to initialize the face tracking. The face tracking verifies the location of the face in each frame of the image. At this step, the rough region of interest for each facial feature is also estimated dynamically. An imaginary line, which divides the face image vertically, can provide the left and right region of the face. Thus, left facial feature, such as left eye, is detected from the upper left region to the vertical centerline, and right facial feature from the upper right region, and nose from the lower center region, and mouth from below the nose, and so on.

The face image is sent to the facial feature detector, and the feature positions are detected. Any real-time facial feature detection algorithms may be used for this module. Two algorithms are used and fused to show examples for the facial feature detection module in the exemplary embodiment of the FET system. First, color based method is used. In color-based method, the mean value of the region of the interest for each feature is compared to the variance of each pixel value within the region of interest. Where there is a significant difference, the pixels are voted as candidate feature positions. This is based on the assumption that the facial features usually have the lower intensity compared to the surrounding neighbor pixels. Second, the mean-crossing method is used. In the mean-crossing method, the transition of the intensity values along with the mean value of the region of the interest is calculated and the corresponding pixel is voted as the candidate feature position. This is based on the assumption that the intensity values around the facial features have a transition from high to low and then low to high because the features usually have lower intensity values than the surrounding neighboring pixels. This causes the transition of the intensity values.

The feature position information is combined with the object images and these two images are used to create augmented images. In order to match the virtual objects with the facial feature position information, the virtual object is processed off-line before the real-time augmentation. Likewise, the pivot points to the virtual objects are assigned off-line. Depending on the type of the virtual objects the pivot points are assigned differently. The virtual object images are manipulated to provide better aesthetic look to the final augmented images before the virtual objects are superimposed on to the facial images. The augmented images are displayed to the user on the screen in real time.

During the entire process, the user can interact with the FET system using motion detection based touch-free selection tool. Through the final superimposed image, the user can feel the objects are attached to her or him because they move according to the person's motion.

One of the implementation goals was to find the position of the facial features in face images efficiently and reliably and to put the virtual objects on the user's face seamlessly in real-time. Another goal was to make the entire process work automatically without any user's manual intervention. The following figures show the overall system design.

DRAWINGS—FIGURES

Figure 2:
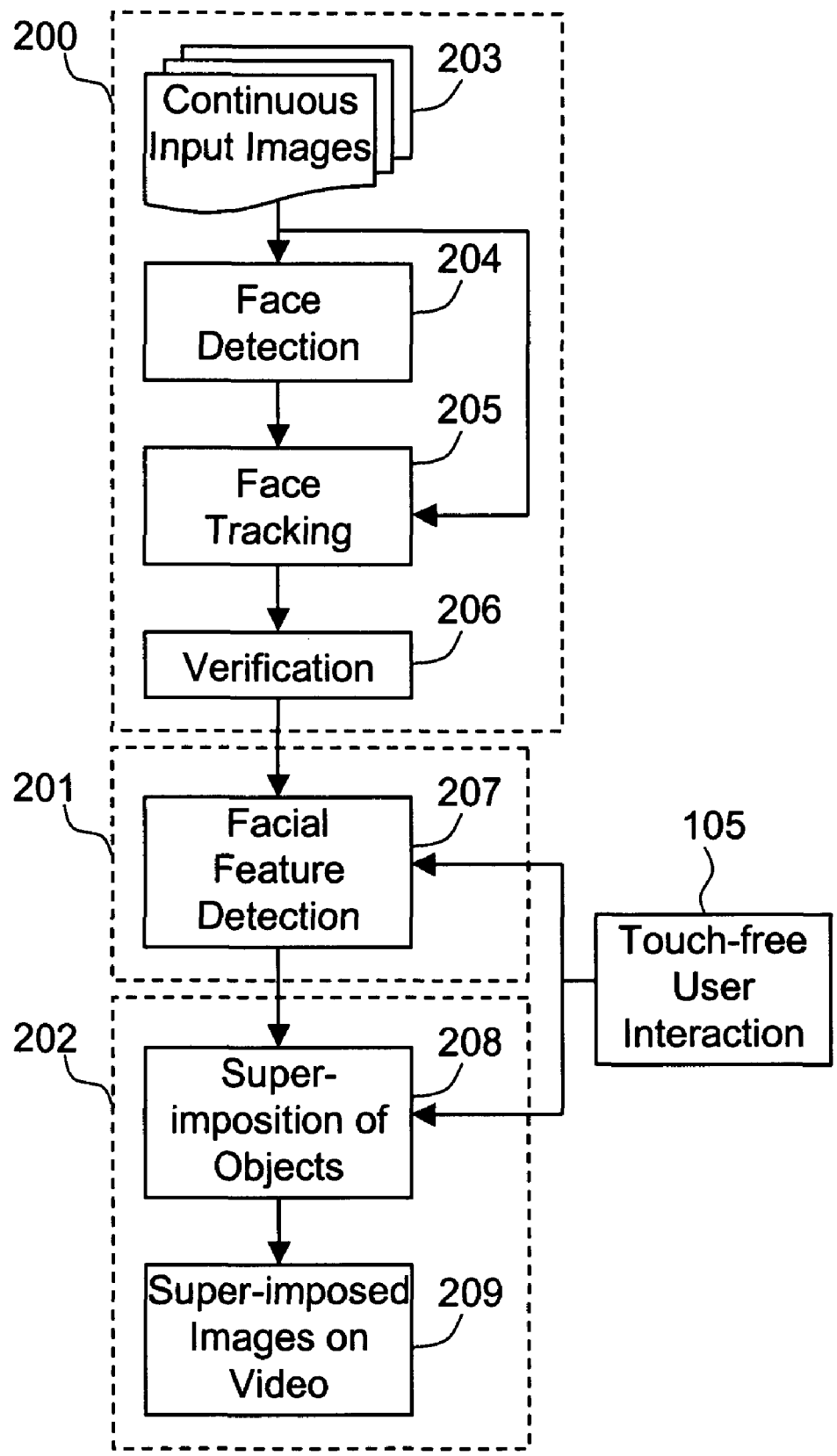
Figure 3:
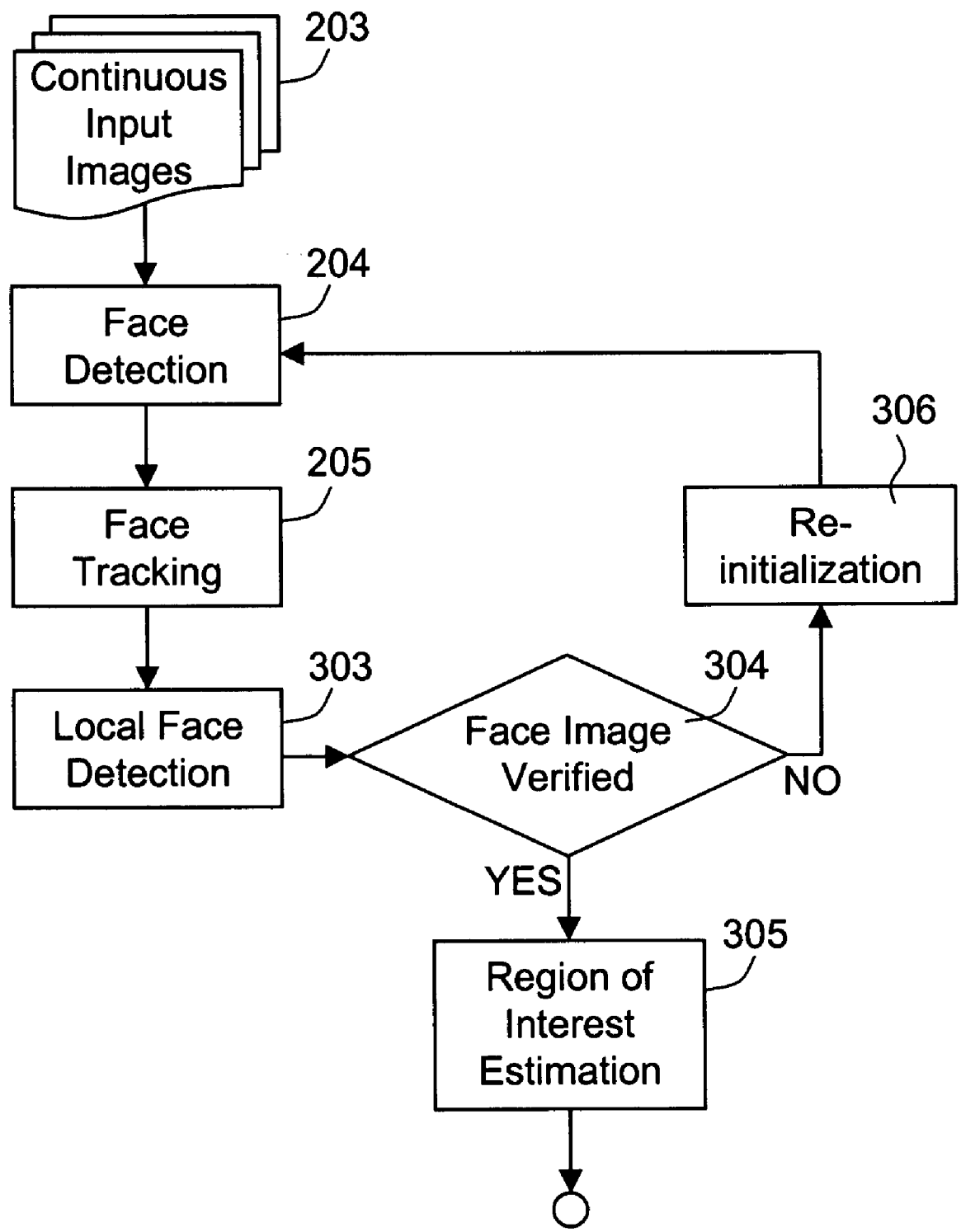

FIG. 1—Figure of the Embodiment of the FET Hardware System and User Interaction
FIG. 2—Figure of the Overall View of the FET System.
FIG. 3—Block Diagram for Initialization Module
FIG. 4—Block Diagram for Facial Feature Detection Module
FIG. 5—Block Diagram for Superimposition Module and User Interaction
FIG. 6—Figure for Virtual Object Pivot Setting and Superimposition
FIG. 7—Figure for Blending of the Virtual Object by Changing Transparency
FIG. 8—Figure for Virtual Object Rotation
FIG. 9—Figure for Virtual Object Translation

DETAILED DESCRIPTION OF THE INVENTION

FIG. 1 shows the overall embodiment of the FET hardware system and user interaction for the present invention. The hardware components of the system consist of image capturing device 100, output display 101, and processing unit 102. The image of the user may be superimposed with a pair of sunglasses image 103, hat image 104, or any other predefined virtual objects, which can be attached to and enhance the human face image 800. The user can select different virtual objects by a motion-based touch-free user interaction/selection process 105. The image-capturing devices automatically adjust the height of the viewing volume according to the height of the user. The user's face is detected 204 at the initial module and it is being tracked and superimposed in real-time.

In this exemplary embodiment shown in FIG. 1, a camera, such as the Sony EVI-D30, and frame grabber, such as the Matrox Meteor II frame grabber, may be used as the image-capturing device 100. A firewire camera, such as the Pyro 1394 web cam by ADS technologies or iBOT FireWire Desktop Video Camera by OrangeMicro, or a USB camera, such as the QuickCam Pro 3000 by Logitech, may be used as the image capturing devices 100 if dynamic control of the field of view is not needed. A large display screen, such as the Sony LCD projection data monitor model number KL-X9200U, may be used for the output display 101 in the exemplary embodiment. A computer system, such as the Dell Precision 420, with processors, such as the dual Pentium 864 Mhz microprocessors, and with memory, such as the Samsung 512 MB DRAM, may be used as the processing unit 102 in the exemplary embodiment. The processing software may be written in a high level programming language, such as C++, and a compiler, such as the Microsoft Visual C++, may be used for the compilation in the exemplary embodiment. Image creation and modification software, such as the Adobe Photoshop, may be used for the virtual object creation and preparation in the exemplary embodiment. Approximately 30 frames per second may be generated from the image capturing devices 100 in the exemplary embodiment. The processing time for the facial feature detection took approximately 10 to 20 milliseconds and superimposition time approximately less than 1 millisecond in the exemplary embodiment.

FIG. 2 shows the three main modules in the FET system and block diagram how the invention processes images and get the final results.

The initialization module 200 is concerned with getting the correct human face image 800 and balancing real-time tracking of the image. Verification 206 using the second local face detection 303 process is used in order to ensure that an accurate face image 800 is fed into the next module.

When a user appears in front of the FET system, the user's face is detected 204 within the continuous input images 203 and the system is automatically initiated to begin the entire initialization process 200. Any robust face detector can do the face detection 204. For this particular embodiment a neural network based face detector was used.

After the face is detected within the entire continuous input images 203, an independent face tracker begins the tracking 205 of the user's detected face. Although, the face detector that we used in the FET system is reliable enough, it generally requires significant amount of processing time. In order to make the FET system to work in real time, efficient use of tracking is designed, so that the face-tracking 205 step, which uses much less processing time, takes over the task right after the initial face is detected. This enables the system to do the entire region face detection 204 only at the beginning of the user interaction. After the initial global face detection 204, the face-tracking 205 process provides the information about the user's face image 800 position and size. For this embodiment, the tracking algorithm may be skin-color and Viterbi algorithm based tracking method. However, that information goes through one more step for the verification 206 before the following facial feature detection module 201 uses it.

Using the correlation measure between pixel values in the edge-detected image, the vertical centerline, which is the virtual line in the middle of the face, may be produced in the initialization module 200. The idea of using the symmetry of the magnitude of the gradient at this step is to find a mid line, which may reduce the region of interest as suggested by D. Reisfeld and Y. Yeshurun in "Robust Detection of Facial Features by Generalized Symmetry", 11th IAPR International Conference on Pattern Recognition, Volume 1, pages 117-120, 1992. The reduced region of interest may serve as the initial template for each facial features. However, It has to be emphasized that these are not fixed templates. These rectangular facial component boxes dynamically change depending on the rough face region measure. Usage of a fixed size template is strongly prohibited in the FET system.

The verification 206 has two goals. First it verifies whether the user is still using the system and did not leave from the system. Second, it also verifies whether the tracker is correctly tracking the face and returns the correct face image 800 to the facial feature detection module 201.

The facial feature detection module 201 does the actual facial feature detection 207 using the input images and information from the previous module. For the facial feature detection 207, the FET system may incorporate multiple algorithms, for which real-time processing is possible. In the exemplary embodiment shown in FIG. 2, the color-based method may be used. The mean-crossing method suggested by C. H. Lin and J. L. Wu in "Automatic Facial Feature Extraction by Genetic Algorithms", IEEE transactions on image processing, Volume 8, no. 6, pages 834-845, June 1999, may be used, mainly due to their speed, simplicity, flexibility to the environmental change. In this exemplary embodiment shown in FIG. 2, the mean-crossing method may give better results overall, so it may be weighted more than the color-based method in the later fusion 405 step.

In the Superimposition module 202 step, the information about the facial features is used in order to superimpose 208 objects on to the user's face image 800. How the selected object image is superimposed onto the face is an important step. In the end, the superimposed image 209 is what the user sees. The superimposed image 209 can be selected by the touch-free user interaction 105. Getting an accurate set of facial feature points is one thing, and how to use the position information in order to match 506 arbitrary objects on the user is another involved task. It could make all the effort meaningless, if the object image is not properly superimposed on the correct position after all the effort for the facial feature detection module 201. Thus, another process for putting the object onto the facial feature position as desired had to be developed, and it is called super-imposer in the FET system.

FIG. 3 shows the initialization module 200 in more detail.

As shown in the exemplary initialization module 200 block diagram, the input to the FET system is continuous input images 203. The FET system is adaptable to the change of the face image 800 size in the continuous video image sequences.

Any robust face detection method, such as the neural network based face detection approach as suggested by M. Yeasin, and Y. Kuniyoshi in "Detecting and Tracking Human Face and Eye Using Space-Varying Sensor and an Active Vision Head", In Proceedings of IEEE Conference on Computer Vision and Pattern Recognition, Volume 2, pages 168-173, 2000, may be used in the exemplary initialization module 200 shown in FIG. 3. The neural network based approach is an example of appearance-based method. In neural networks, the basic assumption is based on the observation that faces are a highly structured class of image patterns and can be detected by examining only local image information within a spatially well-defined boundary. After training a system using example-training images, the system is able to capture complex face patterns. The detection paradigm works by testing candidate image locations for local patterns that appear like faces. One of the strengths is that this method can build a system without defining the features of a face manually. This means such an approach can potentially be extended to detect any other spatially well-defined objects since the system learns from the appearance of the training examples without any prior knowledge. Along with this strength, the robustness of the method is one of the main reasons why the neural network based face detection may be used in the exemplary initialization module 200 of the FET system in FIG. 3.

After the face is detected within the entire input frame, an independent face tracker begins the tracking 205 of the user's detected face. Although, the face detector that we used in the exemplary embodiment of the FET system is reliable enough, it required significant amount of processing time. In order to make the FET system to work in real time, efficient use of face tracking 205 is designed, so that the face-tracking 205 step, which uses much less processing time, takes over the task right after the initial face is detected. The skin-color, Viterbi-algorithm based method, or any real-time face-tracking algorithm may be used for the face tracking 205 step in the exemplary embodiment of the FET system. This enables the system to do the entire region face detection 204 only at the beginning of the user interaction. After the initial global face detection 204, face-tracking 205 process provides the information about the user's face image 800 position and size. However, that information goes through one more step for the verification 206 before the following facial feature detection module 201 uses it.

The verification 206 step uses one of the two types of face detection in the FET system. First face detection 204 is processed within entire frame in order to find whether a user exists in front of the system or not. Second local face detection 303 is processed within a small tracker window for verification 206 purpose.

The verification 206 step has two goals. First it verifies whether the user is still using the system. Second, it also verifies whether the tracker is correctly tracking 205 the face and returns the correct face image 800 to the facial feature detection module 201.

There is a possibility that the face tracking 205 is lost or does not work properly. During the interaction with the FET system, the user might want to stop the interaction and leave the system. With cluttered background and other changing factors in the environment such as light variation or noises, the tracker might track false face region. In any of those cases, we need to verify whether the tracker is tracking 205 the user's face correctly or not. For this reason, the system is designed to run the local face detector 303 within the smaller face tracker window.

Facial feature detection 207 is dependent on the face tracking 205 result. The result from the face tracking 205, which is implemented in the FET system, may not be accurate enough to be used just as it is. Although the face tracking 205 gives fairly good tracking bounding box information for the face coordinate, the face position may not be guaranteed to be in the center of the tracker-bounding box. Initially, we applied the facial feature detection algorithm onto this face-tracking 205 bounding box region in the exemplary embodiment of the FET system. However, the skin-color based face-tracking region is prone to error and has a possibility of giving a wrong value of the mean of skin color to the facial feature detector. The wrong value of the mean of the skin color could give wrong result for finding facial features consequently. For this reason, our initial implementation sometimes showed unexpected facial feature detection 207 results in the exemplary embodiment of the FET system.

In order to solve this problem, we had to find more accurate face position and surrounding region within the face-tracking 205 bounding box window. This is why the second face detection 303 is applied once again within the face-tracking 205 region. This face-detection reinforcement significantly improved the correctness of finding the facial features. Although running the process within the local region cost a little more processing time, it was a necessary step. The reduced frame rate by the result of the second face detection 303 process, in the exemplary implementation, did not affect the entire performance of the FET system because the FET system could perform well with less than full 30 frames per second. It does not have to get the facial feature detection 207 information from every frame because the changes within the face images between 1/30 second are trivial. Our average frames per second were around 10 for running the facial feature detection 207 in the exemplary implementation, and this gave us enough information for the real time image superimposition.

Since the face tracking 205 window is very small compared to the entire frame, this process usually does not consume much of the processing time. Furthermore, this is an asynchronous process, which runs on a separate thread. This also helps with the CPU resource management.

One of the goals of FET system as a real-time system is obviously to make the user not feel the delay in the system. Fast processing power is a big help for this goal, but the use of asynchronous multi-threading programming for the face detection 204 is another big factor to maximize the efficiency. Approximately, it took 0.5 to 2 seconds for the entire region face detection 204, but this is done only at the initial stage. The initial delay is not wasted but used as a preparation stage from the user's point of view. During the initialization time the user usually becomes acquainted to the system environment and come to know how to use the system through the easy and clear FET interface in the exemplary implementation.

When the verification 206 is successful 304, the initialization module 200 is able to estimate the region of the interest 305 for each feature dynamically. When the track is lost or verification 206 fails, the face detection 204 is executed again over the entire frame. This re-initialization 306 is an expensive process in terms of processing time, but this has to be carried out in order to ensure that the correct face track is processed and make the system to be reusable by the next user when the interaction is over. If the face tracking 205 works correctly, and the small area local face detection 303 is successful the face images 800 that are being tracked by the tracker are passed onto the facial feature detection module 201.

Figure 4:
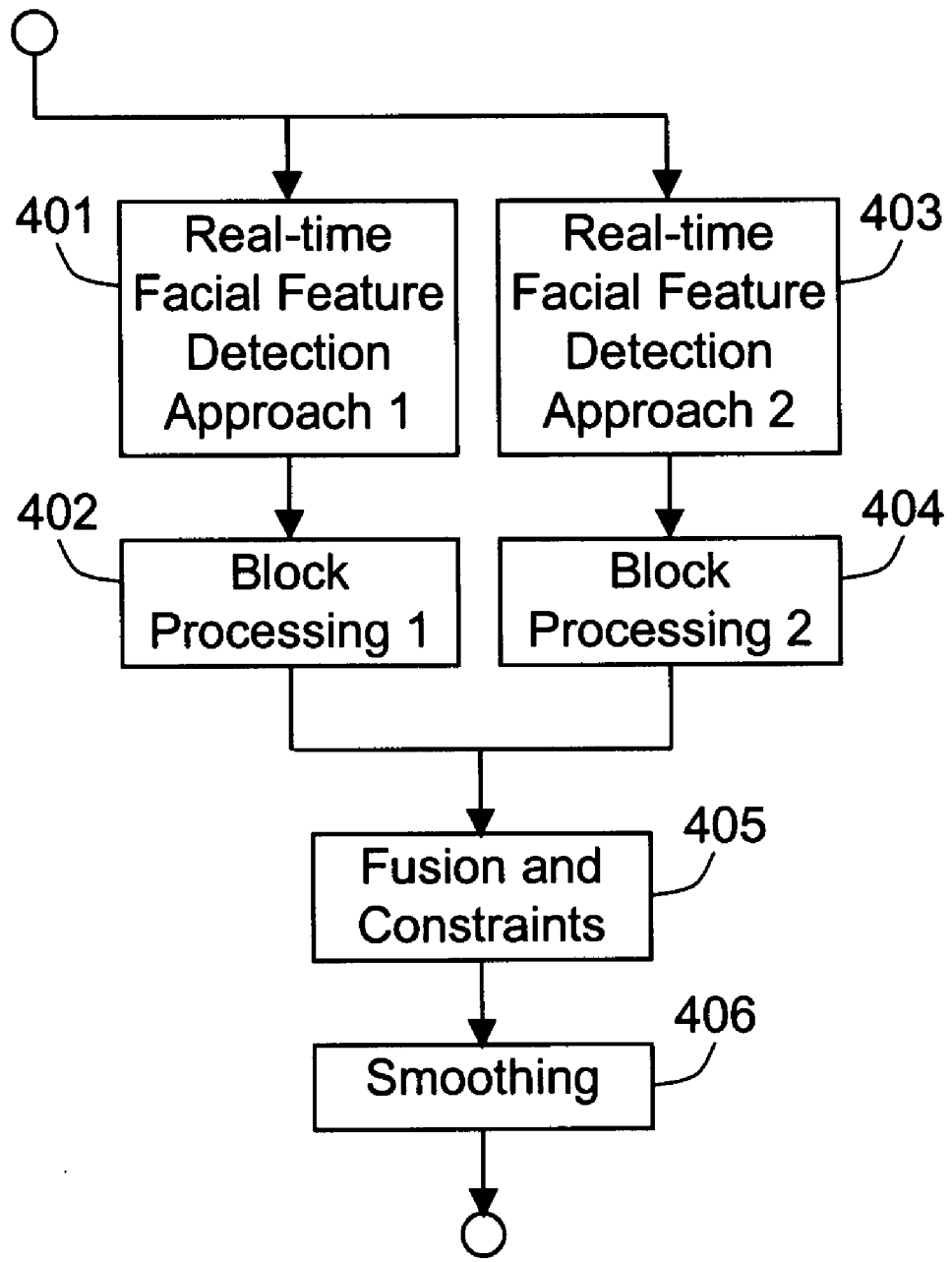

FIG. 4 shows the detailed steps in the facial feature detection module 201.

Generally any robust real-time facial feature detection approach may be used in the exemplary facial feature detection module 201 of the FET system in FIG. 4 401, 403. However, there are challenges for detecting facial features in low-resolution continuous images in real-time. Most of the eye detection algorithms, which use the template matching or the principal component analysis, require the normalization of the image face with respect to its size and orientation when the variations in size and orientation of the image face are not small.

It is generally difficult to use a fixed size template or wavelet based method for the facial feature detection in a low-resolution 2D image. The image might not provide enough information for these approaches because of noise and inherent problems. Lack of enough information is one of the most difficult obstacles for the low-resolution facial feature detection 207.

Some other challenges, which the real-time and automatic facial feature detection methods have to overcome, are the following.

a. The detection system has to integrate all the supporting pieces of the algorithms in a way the real-time processing is possible. This means that very complicated algorithms, which require demanding processing time, are preferably avoidable. For example, a time-consuming transformation function may not be appropriate.

b. The system has to work on continuous video input images rather than a static image. This also means that it has to be adaptive to the variation of the continuous images from frame to frame. The image conditions from frame to frame could be different.

c. The user has to be able to use the system naturally without any hassle of initializing the system manually. In another words, the system has to automatically initialize itself.

d. Usage of threshold and fixed size template has to be avoided.

e. It has to work with not only high-resolution images but also low-resolution images and adapt to the change of resolution. This is because the size of the user's face and its feature could change by the user's motion in the real-time input image.

f. It has to be tolerant to noise and lighting variation for a practical working system.

g. It has to be user independent, which means it has to work with different people with different skin color and shape variation of the facial features.

Although the facial feature detection approaches, reported in literature, have strengths in individual approaches, there is no perfect solution that satisfies all the above challenges yet.

First, many approaches used high-resolution and cleanly captured images as the input face image. They do not address how their algorithm could work for low-resolution images. It is generally more expensive to process high-resolution images than low-resolution images. Even with a very fast frame grabber and video card, it is still true that high-resolution pictures could become a burden to the complex series of processing for input and output. Although low-resolution images contain less information than the high-resolution images, they are frequently used in a real-time system in order to reduce the processing cost. Therefore, it is a necessary that the algorithm in the system has to work with the low-resolution images.

Real-world input images could be not only low-resolution images but also noisy images. We cannot possibly account for all possible situations in an unmanned automatic system in a real world. The input images in real-time in a real environment could contain noises by various factors. This requires an algorithm that is robust to noise.

Second, many of the previous work were implemented under perfectly controlled environment, which we cannot expect in a real world situation. Many input images were captured with a plain background rather than a cluttered background. In those algorithms, the face image was captured from the user who was standing in front of a plain wall, which usually was dark and a single color. Along with the cluttered background, the crowd situation is not also mentioned clearly.

In some approaches, lighting condition problems are not mentioned properly. Their lighting condition was controlled and assumed to be perfect, because the experimentation was done within a lab where usually the lighting condition does not change. The results did not show enough consideration about the uneven lighting source or shading on the input images.

Third, the face images were mostly static. Most of them used well-captured static images. Most of the approaches do not show how the system works for video image or a real-time image. Some of them even did not bother to do the face detection process, because they assumed they already have the face images. For real-time processing, the degree of variation of the each input image per frame is very high.

Virtually, all users move constantly, so every frame has different face images, which has different size, different proportion of the facial features, change of the gaze direction, variation of color intensity distribution by direct and indirect lighting and obstacles. The approach has to take care of all the changes in the image.

Many of the algorithms were designed under the assumption that the input image contains head-and-shoulder rather than entire body.

Considering the challenges in the facial feature detection mentioned above, simple variation of the color-based method or variation of the mean-crossing (intensity variation) checking method within the Genetic algorithm may work in real-time and is a practical solution to the real-time facial feature detection on 2D image in the exemplary facial feature detection module 201 of the FET system in FIG. 4.

The mean-crossing algorithm scans a feature region and tries to find the candidate by applying the mean-crossing function, which is generally known as the following $F(t_0)$.

$$F(t_0) = C_m(t_0) + U_{I(t_1)-I(t_0)-K} \cdot U_{I(t_2)-I(t_0)-K} \cdot C_c(t_0)$$

where $t_0$ is the evaluated candidate feature point, $C_m$ is the mean crossing function, $C_c$ is the central weighting function, K is a constant, I(p) is the intensity of the point p, and U is the unit step function.

Much more detailed explanation about the algorithms can be found in C. H. Lin and J. L. Wu's "Automatic Facial Feature Extraction by Genetic Algorithms", IEEE transactions on image processing, Volume 8, no. 6, pages 834-845, June 1999. The proposed algorithm also need not normalize the size and the orientation of the face in the image.

However, this method is also weakened by the environmental variation and noise with the cluttered background. The best possible candidate could be a slightly misplaced pixel rather than the actual candidate position because of noise. In order to alleviate this problem, we add a little variation by applying the block processing 402, 404 in addition to the original approach. The block processing 402, 404 looks at the neighboring feature candidate points and count into the final feature candidate position. The modified function is described as follows.

$$F_{FET}(b_0) = \max\left[\sum_{i=by_0}^{by_1} \sum_{j=bx_0}^{bx_1} F_{i,j}(t_0)\right]$$

where $b_0$ is the evaluated block, $F_{i,j}(t_0)$ is the cost of the candidate point at (i,j) within the block, $bx_0$, $bx_1$, $by_0$, and $by_1$ denote the starting and ending position of the block.

This simple modification makes the approach tolerant to the environmental variation and noise in the cluttered background. This simple modification is also applied to the color-based approach in the exemplary facial feature detection module 201 of the FET system in FIG. 4.

The two results, which are in the exemplary facial feature detection module 201 of the FET system in FIG. 4, one from the color-based method and the other from the mean-crossing method, may be weighed and fused 405 by the sum of the weighed values. There is an example of the fusion of two different approaches as suggested by Q. Sun, W. Huang and J. Wu in "Face detection based on color and local symmetry information", Proc. of the third IEEE international conference on automatic face and gesture recognition, pages 130-135, Japan, 1998, although the detailed methods are different and the final goal of the fusion is also different. Generally the result from the mean-crossing algorithm is more accurate than that of the color-based algorithm. It is relatively invariant to the lighting condition and environmental situation. The fusion 405 of the two methods is adjusted by some constraints to avoid extreme cases, which could be defined incorrectly by the structural description of the face and the relationship among the facial features.

This result is returned as the final facial feature points. However, before they are used by the following superimposition step, the positions of the facial features are smoothed 406 over the consecutive frames by a Kalman filter.

Figure 5:
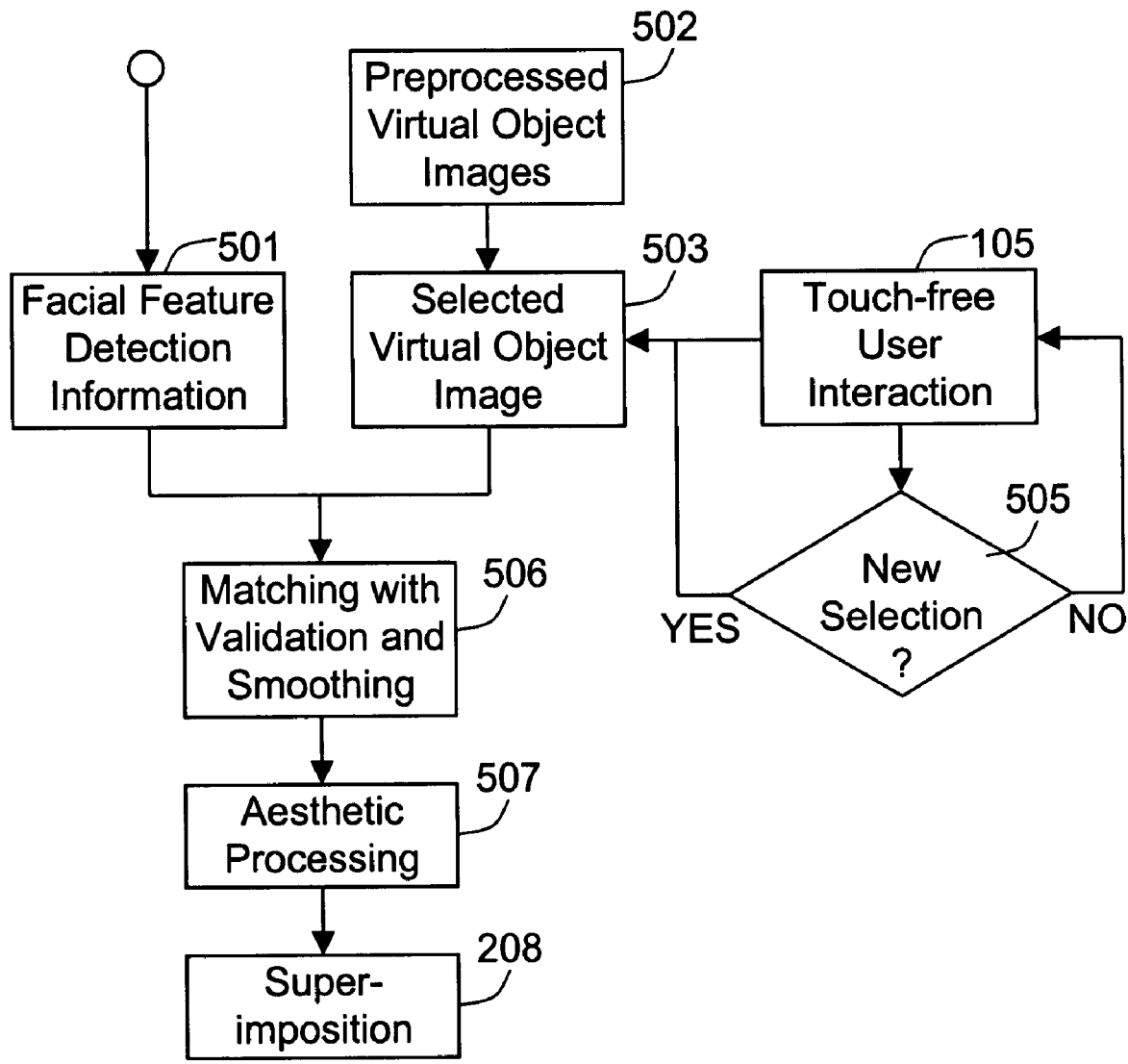
Figure 6:
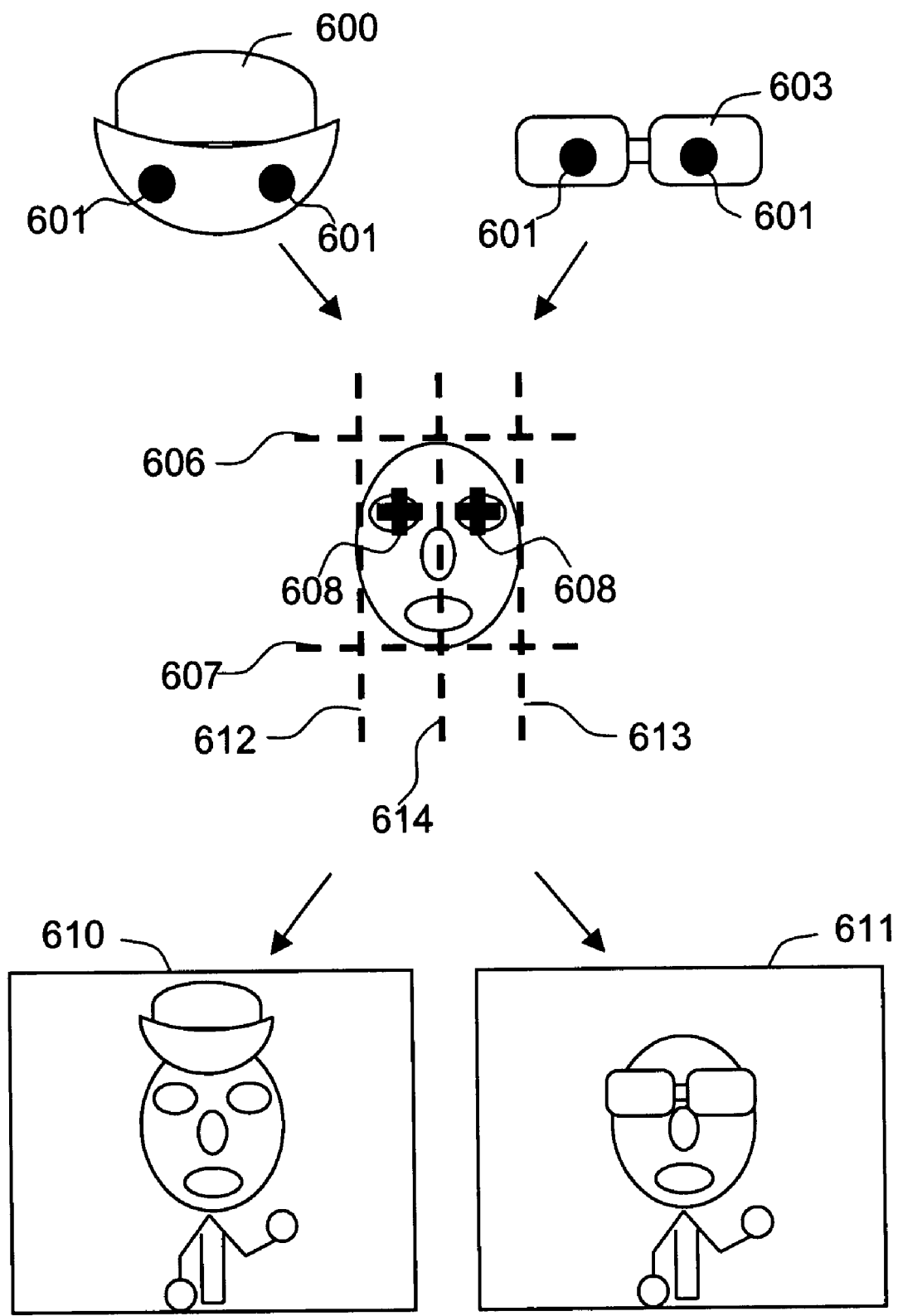

FIG. 5 shows how the super-imposer does the superimposition along with the selection of the virtual objects. FIG. 6 shows the details of setting pivot points 601 for the virtual objects and the superimposition by matching the pivot points 601 with the result from the facial feature detection module 201.

The super-imposer is mainly concerned about two things. First, the object is to be matched 506 at the correct position, and the size is to be rescaled according to the measure of the facial features through a validation and smoothing 406 process. Second, the texture of the object image is adjusted so that the superimposition display looks seamless and aesthetically appropriate 507.

The super-imposer receives facial feature detection information 501 about the face measurement from the facial feature detection module 201, and it initialize its internal variables with the information, such as eye position 608, left face-line 612, right face-line 613, vertical center line 614 of the face image 800, uppermost-line 606 of the face image 800, and lowermost-line 607 of the face image 800. It sets the style of the virtual object images 502 at the initial stage, and the super-imposer applies different measures depending on the style of the selected object image 503. For example, if the object style is set with regard to the eye positions, such as a pair of sunglasses, it uses the eye position information 608, and if it is related to the top of the face, such as a hat image 104, it uses the position information from the uppermost-line 606 of the face image 800.

The object images are prepared offline by setting the pivot points 601 with respect to the characteristics of the virtual object images 502, and those points are matched 506 with the facial feature points. The objects that are superimposed on top of facial features should be known beforehand, and how the object images are superimposed can be specified beforehand. For example, the center of the lenses of a pair of sunglasses could be set as the pivot points 601 and they can be matched 506 with the center of the eye positions 608 in order to create a composite image 611 with the virtual sunglass image 103. In another example, the uppermost-line 606 of the face image 800 can be used in order to create a composite image 610 with the virtual hat image 104.

The degree of the variation for each object pivot points 601 is high. For example, different sunglass images have different length and distance between left and right glasses, shape, height, and angle. In order to put the virtual object images 502 like a pair of sunglasses image 103 in a desired position, each individual object images should be uniquely preprocessed. Just setting the geometric center of the glass as the pivot point 601 is not also enough. For a headwear 600, such as hats or visor, the same problem exists. Usually caps have a uniform bottom line, but women's hats have various bottom lines. Number of pivot points 601 could be also different depending on the purpose and characteristics of the object. Unless there is a system that does the object recognition and finds the pivot positions automatically, this step requires off-line preprocessing by hand.

Depending on the object pivot points 601 and the facial features, the super-imposer adjusts the size of the superimposed object by changing the distance between the pivot points 601 that are assigned to that specific object and resealing the object image. For example, in the case of the sunglass images, the distance between the two pivot points 601 could be different from the distance between the two eye positions. Thus it is resealed accordingly. The ratio of the object is kept not to change the overall shape of the object.

Smoothing 406 and validation processes are imposed within the super-imposer for the size and the position. The FET system dynamically changes the size according to the user's movement in front of the system. If the user comes closer to the system, the face image 800 size is getting bigger and the object size is adjusted to be bigger appropriately. There is a chance that the facial feature detection information 501 might cause a sudden change of the facial size and consequent object size. However, between the two consecutive frames, there should not be drastic changes of size and position. In order to avoid this sudden change and smooth 406 the result, two history buffers, which contain information about the previous size and position of the object image are used. These buffers remove sudden changes and adjust the next size and the position of the object.

Figure 7:
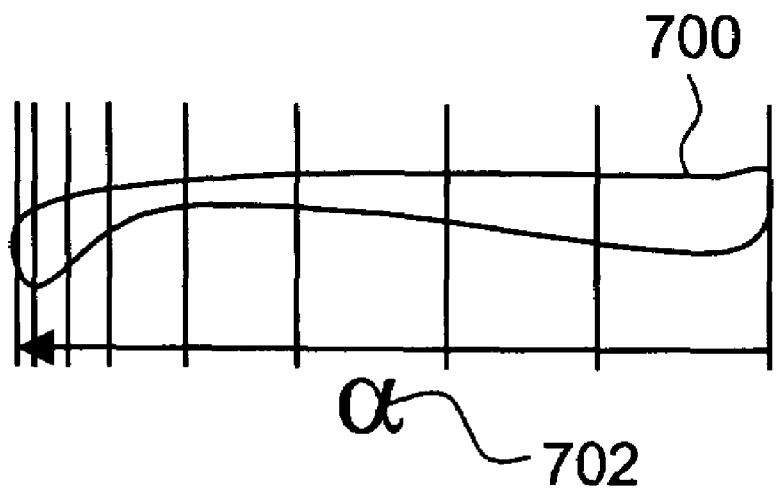
Figure 7:
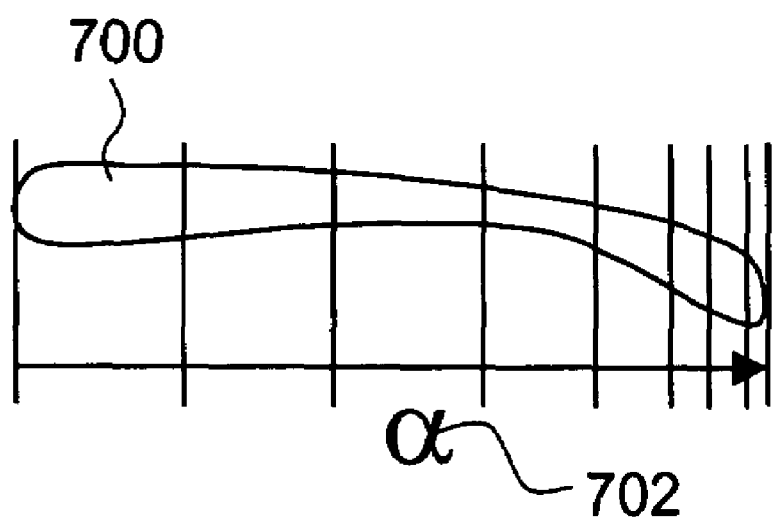
Figure 8:
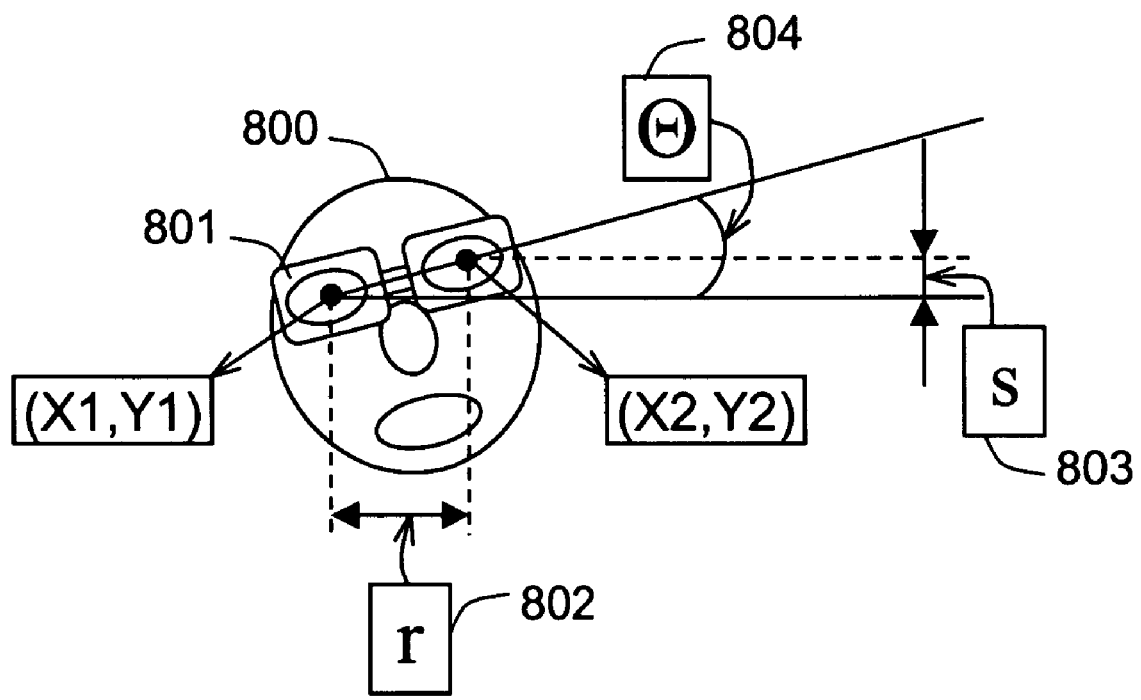
Figure 9:
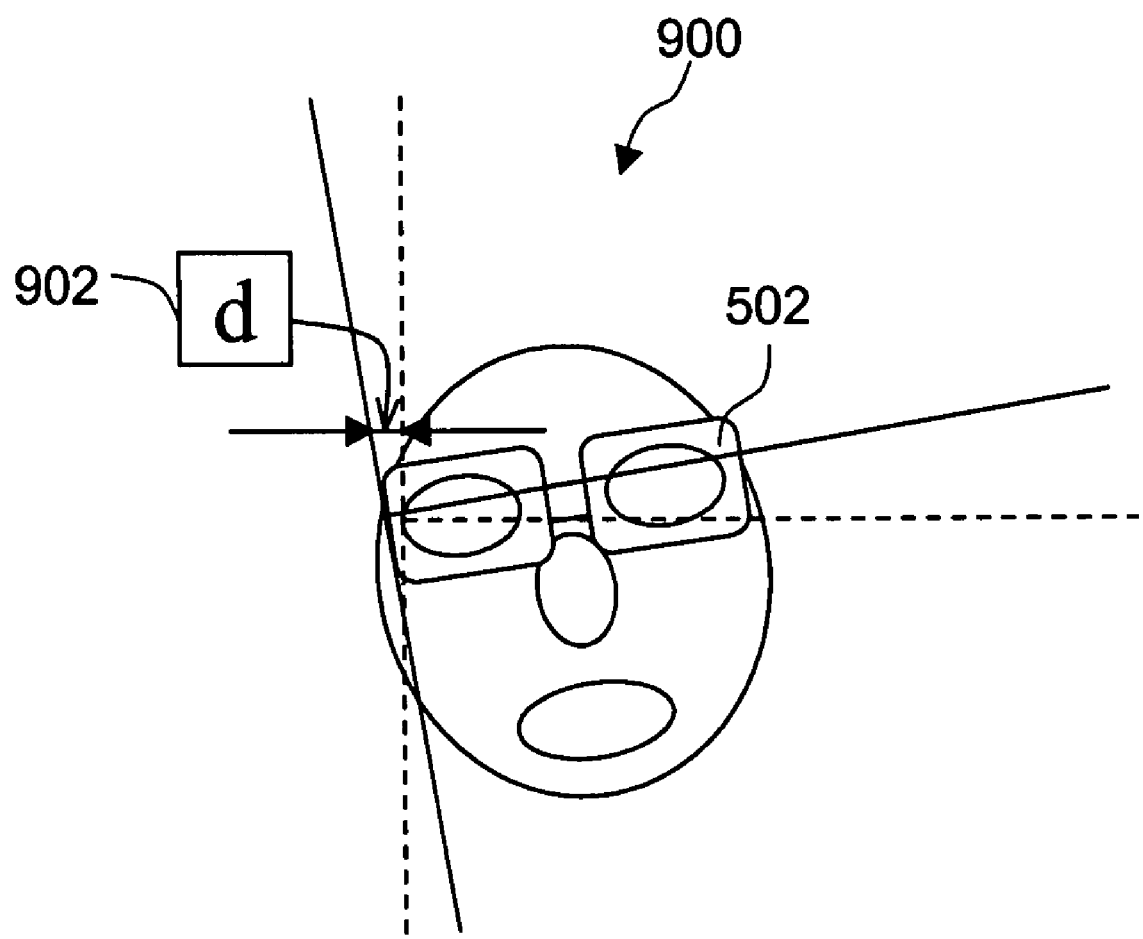

Once we get the smoothed size and position, following techniques are applied for better seamless and aesthetic superimposition 507. FIG. 7, FIG. 8, and FIG. 9 show the details of some of such example techniques in the FET system.

Blending is one such technique, which applies linearly weighted transparency 702 and shading to the virtual objects. For example, the leg 700 of a pair of sunglasses disappears gradually as it goes from the front of the glasses towards the back of ears because of the linearly weighted transparency channel in the image 702. Then, the object is superimposed 208 on top of correct place.

Using the horizontal line, which is extended from the two eyes, we are able to know how much the face image 800 is slanted. This can be applied to rotate the object along the z-axis and set the angle 804 from the horizontal line, so that when the user's face image 800 is moved and slanted, the object is also slanted 801 accordingly. The angle Θ 804 is an approximated radian by $$\frac{s}{r}$$

, where the radius r 802 is the distance $(x_2-x_1)$ between eyes $(x_1,y_1)$ and $(x_2,y_2)$. The circumference s 803 is approximated by the distance $(y_2-y_1)$. Since the difference between the actual circumference 803 and the approximation is trivial, the approximation is enough for getting the angle 804.

While setting the angle 804 between the horizontal line and the object, the object position is slightly shifted toward the right in order to take care of the offset that is caused by the rotation 900 of the face image 800 and the virtual object image 502. After the virtual object image 502 is rotated 900, the offset d 902 makes the object image is shifted toward one side a little bit. In order to take care of the offset, the object image is translated by $$\frac{d}{2}$$

to the appropriate direction. In the above example, the object is translated toward left by $$\frac{d}{2}.$$

In parallel to the facial feature detection 207 and the superimposition process, the user can select 505 different virtual objects, a selected virtual object image 503, by touch-free user interaction 105. The final superimposition is displayed to the user in real-time, in which the user feels he/she immerged into a virtually constructed new environment.

We claim:

1. A method for enhancing facial images of a person in a video by superimposing virtual object images onto said facial images automatically and dynamically in real-time, comprising the following steps of:
   (a) capturing a plurality of images for said person with at least one means for capturing images,
   (b) processing said plurality of images in order to detect the face of said person in said plurality of images for an initial face detection,
   (c) tracking the detected face in real-time using a face tracking window,
   (d) verifying said face within the boundary of the face tracking window using a second local face detection,
   (e) calculating facial feature coordinate information from said face by applying a plurality of facial feature detection approaches and applying a block-processing,
   (f) processing a touch-free interaction by said person to select virtual object images, and
   (g) superimposing said virtual object images onto said facial images automatically and dynamically in real-time,
   wherein the virtual object images comprise predefined virtual objects that can be attached to and enhance the facial images,
   whereby the verification of said face within the boundary of the face tracking window makes more accurate facial images to be passed on to the next step while enabling real-time tracking of the face, and
   whereby said touch-free interaction enables said person to choose said virtual object images on a means for displaying output to superimpose onto said facial images without touching any device.

2. The method according to claim 1, wherein the method further comprises a step of repeating the steps from (a) to (g) for a plurality of persons.

3. The method according to claim 1, wherein the method further comprises a step of estimating regions of interest for each facial feature in said face dynamically,
   whereby said regions of interest change according to the results from the step of verifying said face within the boundary of the face tracking window, and
   whereby said regions of interest are used as boundaries for detecting each facial feature, such as eyes, nose, and mouth on said face.

4. The method according to claim 1, wherein the method further comprises a step of applying fusion algorithms and geometrical constraints to said facial feature coordinate information.

5. The method according to claim 1, wherein the method further comprises a step of smoothing said facial feature coordinate information.

6. The method according to claim 5, wherein the method further comprises a step of storing a history of a plurality of said facial feature coordinate information and applying a smoothing algorithm for the current facial feature coordinate using said history of said facial feature coordinate information.

7. The method according to claim 1, wherein the method further comprises a step of combining the face detection process and the real-time face tracking process,
whereby the integration enables efficient and robust real-time facial image processing.

8. The method according to claim 1, wherein the method further comprises a step of applying said block-processing to each of said plurality of facial feature detection approaches.

9. The method according to claim 1, wherein the step of (g) superimposing said virtual object images onto said facial images automatically and dynamically in real-time further comprises steps of:
(a) preparing virtual object images,
(b) validating said facial feature coordinate information,
(c) smoothing,
(d) aesthetic processing, and
(e) processing final superimposition.

10. The method according to claim 9, wherein the step of (a) preparing virtual object images further comprises a step for setting pivot points in said virtual object images.

11. The method according to claim 9, wherein the step of (d) aesthetic processing further comprises a step for processing rotation and translation of said virtual object images.

12. An apparatus for enhancing facial images of a person in a video by superimposing virtual object images onto said facial images automatically and dynamically in real-time, comprising the following steps of:
(a) capturing a plurality of images for said person with at least one means for capturing images,
(b) processing said plurality of images in order to detect the face of said person in said plurality of images for an initial face detection,
(c) tracking the detected face in real-time using a face tracking window,
(d) verifying said face within the boundary of the face tracking window using a second local face detection,
(e) calculating facial feature coordinate information from said face by applying a plurality of facial feature detection approaches and applying a block-processing,
(f) processing a touch-free interaction by said person to select virtual object images, and
(g) superimposing said virtual object images onto said facial images automatically and dynamically in real-time,
wherein the virtual object images comprise predefined virtual objects which that can be attached to and enhance the facial images,
whereby the verification of said face within the boundary of the face tracking window makes more accurate facial images to be passed on to the next step while enabling real-time tracking of the face, and
whereby said touch-free interaction enables said person to choose said virtual object images on a means for displaying output to superimpose onto said facial images without touching any device.

13. The apparatus according to claim 12, wherein the apparatus further comprises means for repeatedly using the means from (a) to (g) for a plurality of persons.

14. The apparatus according to claim 12, wherein the apparatus further comprises means for estimating regions of interest for each facial feature in said face dynamically,
whereby said regions of interest change according to the results from using the means for verifying said face within the boundary of the face tracking window, and
whereby said regions of interest are used as boundaries for detecting each facial feature, such as eyes, nose, and mouth on said face.

15. The apparatus according to claim 12, wherein the apparatus further comprises means for applying fusion algorithms and geometrical constraints to said facial feature coordinate information.

16. The apparatus according to claim 12, wherein the apparatus further comprises means for smoothing said facial feature coordinate information.

17. The apparatus according to claim 16, wherein the apparatus further comprises means for storing a history of a plurality of said facial feature coordinate information and applying a smoothing algorithm for the current facial feature coordinate using said history of said facial feature coordinate information.

18. The apparatus according to claim 12, wherein the apparatus further comprises means for combining the face detection process and the real-time face tracking process,
whereby the integration enables efficient and robust real-time facial image processing.

19. The apparatus according to claim 12, wherein the apparatus further comprises means for applying said block-processing to each of said plurality of facial feature detection approaches.

20. The apparatus according to claim 12, wherein the means for (g) superimposing said virtual object images onto said facial images automatically and dynamically in real-time further comprises means for:
(a) preparing virtual object images,
(b) validating said facial feature coordinate information,
(c) smoothing,
(d) aesthetic processing, and
(e) processing final superimposition.

21. The apparatus according to claim 20, wherein the means for (a) preparing virtual object images further comprises means for setting pivot points in said virtual object images.

22. The apparatus according to claim 20, wherein the means for (d) aesthetic processing further comprises means for processing rotation and translation of said virtual object images.

* * * * *